US009349076B1

(12) United States Patent
Liu et al.

(10) Patent No.: US 9,349,076 B1
(45) Date of Patent: May 24, 2016

(54) TEMPLATE-BASED TARGET OBJECT DETECTION IN AN IMAGE

(71) Applicant: Amazon Technologies, Inc., Reno, NV (US)

(72) Inventors: Jiongxin Liu, New York, NY (US); Hoi-Cheung Pang, Seattle, WA (US); Qian You, Seattle, WA (US); Mark Alan Jackson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/137,686

(22) Filed: Dec. 20, 2013

(51) Int. Cl.
*G06K 9/62* (2006.01)
*G06K 9/32* (2006.01)

(52) U.S. Cl.
CPC ............ *G06K 9/6256* (2013.01); *G06K 9/3233* (2013.01); *G06K 9/6202* (2013.01); *G06K 9/6267* (2013.01)

(58) Field of Classification Search
None
See application file for complete search history.

(56) References Cited

U.S. PATENT DOCUMENTS

| 5,155,801 | A | 10/1992 | Lincoln |
| 6,259,803 | B1 | 7/2001 | Wirtz et al. |
| 6,999,614 | B1 * | 2/2006 | Bakker et al. ................. 382/159 |
| 8,131,018 | B2 | 3/2012 | Wilson |
| 8,194,136 | B1 | 6/2012 | Askey et al. |
| 8,385,658 | B2 | 2/2013 | Elangovan et al. |
| 8,433,133 | B2 | 4/2013 | Guerzhoy et al. |
| 8,456,527 | B2 | 6/2013 | Elangovan et al. |
| 2005/0117779 | A1 * | 6/2005 | Horie ................. G06K 9/00362 382/103 |
| 2008/0123968 | A1 * | 5/2008 | Nevatia ............. G06K 9/00369 382/228 |
| 2008/0166016 | A1 | 7/2008 | Sibiryakov et al. |
| 2009/0262981 | A1 * | 10/2009 | Ike ........................ G06K 9/3233 382/103 |
| 2011/0051999 | A1 * | 3/2011 | Tu ........................ G06K 9/3216 382/103 |
| 2013/0094757 | A1 | 4/2013 | Perlin et al. |
| 2013/0329964 | A1 * | 12/2013 | Nishi ................. G06K 9/00362 382/110 |

FOREIGN PATENT DOCUMENTS

| EP | 2 450 851 A1 | 5/2012 |
| WO | WO 2012/066744 A1 | 5/2012 |

OTHER PUBLICATIONS

Lin, Zhe, et al. "Hierarchical part-template matching for human detection and segmentation." Computer Vision, 2007. ICCV 2007. IEEE 11th International Conference on. IEEE, 2007. 8 pages.*
Agarwal, Shivani, Aatif Awan, and Dan Roth. "Learning to detect objects in images via a sparse, part-based representation." Pattern Analysis and Machine Intelligence, IEEE Transactions on 26.11 (2004): 1475-1490. 16 pages.*

* cited by examiner

*Primary Examiner* — Sumati Lefkowitz
*Assistant Examiner* — Ryan P Potts
(74) *Attorney, Agent, or Firm* — Knobbe, Martens, Olson & Bear, LLP

(57) ABSTRACT

Systems and methods are provided for detecting target object(s) within image(s) based on selective template matching. More specifically, the systems and methods relate to template generation, selection and matching based on the identification of regions of interest within image(s). Training images showing target object(s) can be obtained and regions of interest that are deemed more likely to contain part(s) of the target object can be identified based on the training images. Subsequent to the identification of regions of interest, templates for target object detection can be generated based thereon. Templates can be applied on testing images. Based on the test application of templates, a subgroup of templates can be selected to serve as a basis for target object detection in subsequent images.

23 Claims, 10 Drawing Sheets

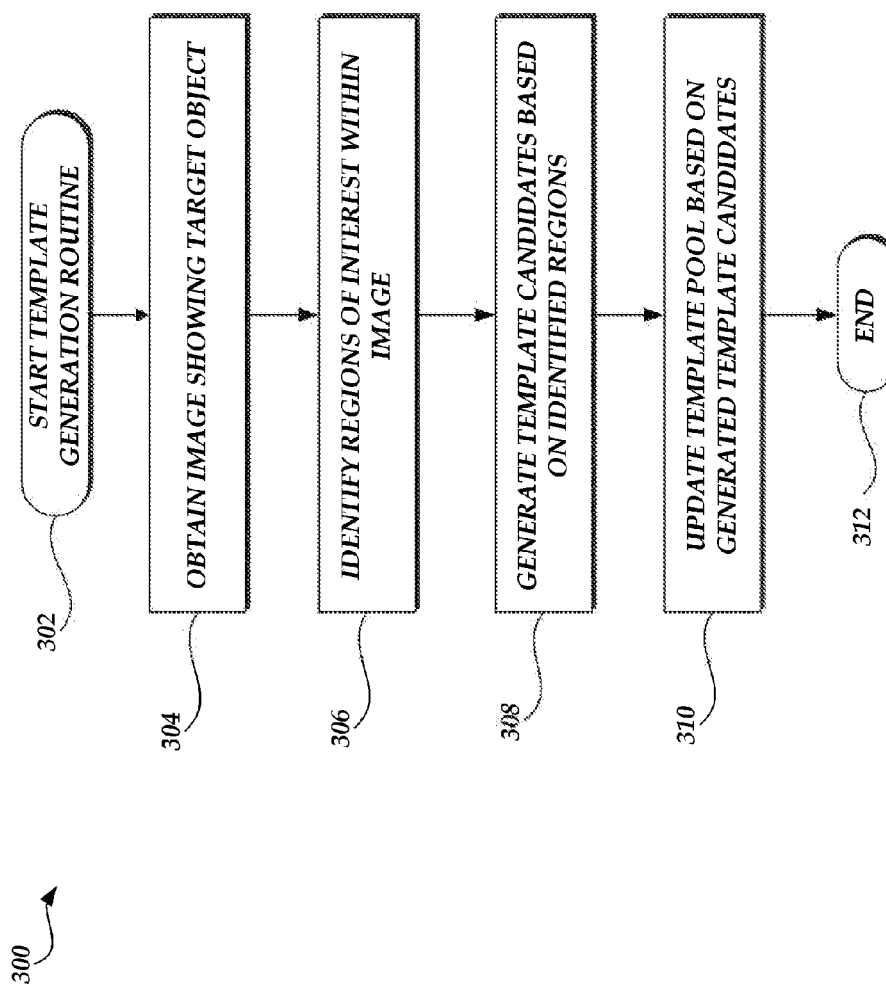

TEMPLATE-BASED TARGET OBJECT DETECTION IN AN IMAGE

BACKGROUND

In many computing-centric commerce models, consumers are able to efficiently view and purchase a wide variety of items, including both goods and services, over computer networks. In some scenarios, a particular network resource, such as a commerce Web site, can offer goods and services provided by multiple sellers. Often, individual sellers will provide information related to the item for sale, which can include one or more images depicting aspects of the item. However, to provide for a more consistent user experience, the host of the commerce Web site can specify requirements or rules related to how items are depicted in images submitted by the individual sellers.

The host or operator of the commerce Web site can manually inspect submitted images to determine compliance with specified requirements or rules. However, in scenarios involving a larger number of sellers submitting images for use with regard to the sale or distribution of the sellers good or services, manual inspection and verification techniques can be inefficient.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 3A is a flow diagram of an illustrative method implemented by a data processing module for generating templates for target object detection based on identified regions of interest within image.

DETAILED DESCRIPTION

Figure 1:
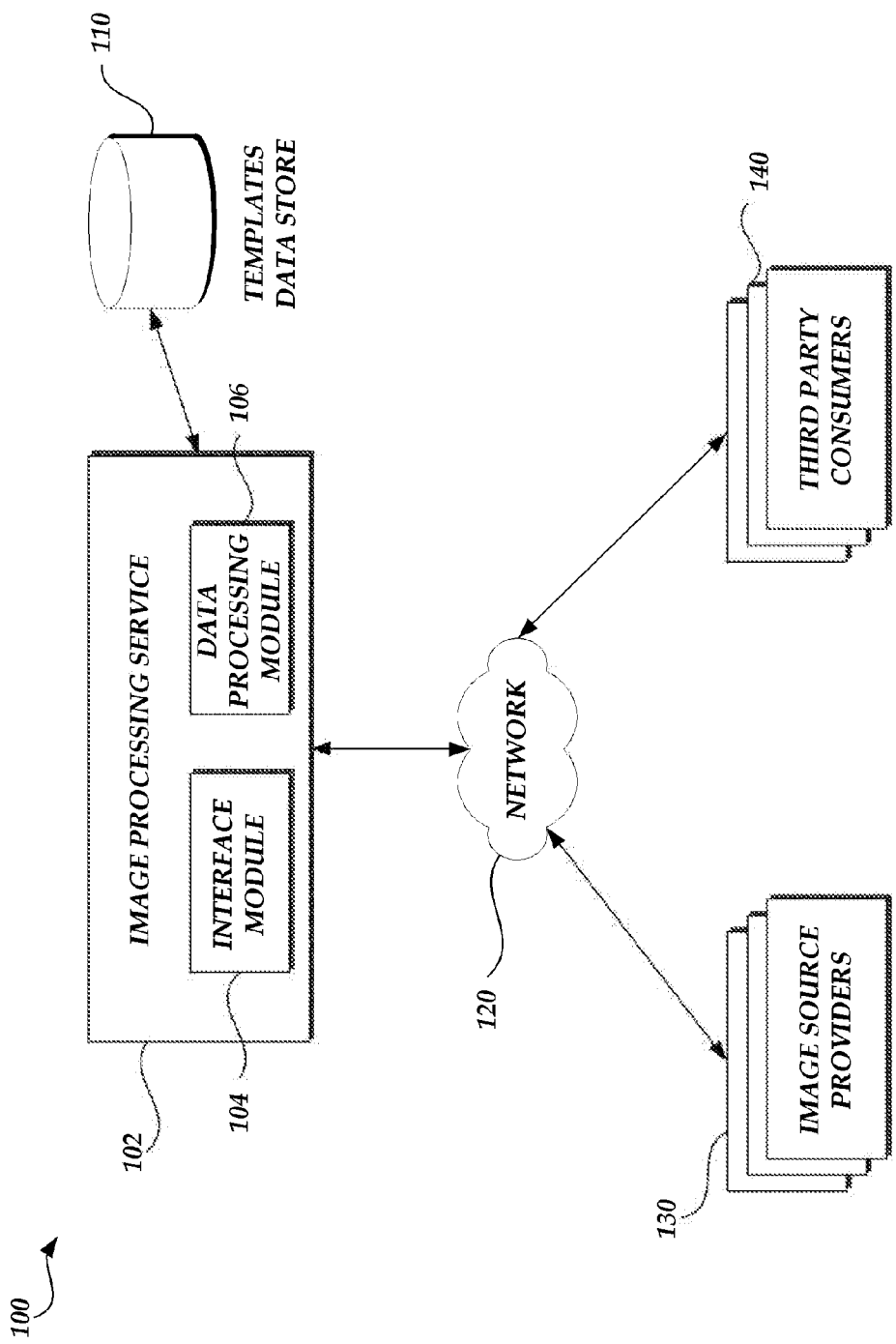
FIG. 1 is a block diagram depicting one embodiment of an operating environment for an image processing service for target object detection based on templates.

Generally described, the present disclosure corresponds to automated methods and systems for detecting one or more target objects within images based on selective template matching. Template-based target object detection methods typically involve matching the image against a template and calculating a similarity measure. More specifically, aspects of the present disclosure relate to template generation, selection and matching based on the identification of regions of interest within submitted images. In accordance with an illustrative embodiment, an image processing service obtains training images depicting one or more target objects and identifies regions of interest that are deemed more likely to contain at least some part of the target object based on the training images. Illustratively, the regions identified can be rectangular, triangular, or any other shape. In some cases, the shape is determined by the template matching technique employed. In other cases, the shape is determined for computational convenience, and in still other cases, the shape is determined by features of the target object.

The image processing service can generate templates based on the identified areas of interest so that the templates correspond to different portions of target objects as depicted. Generated templates can then be stored in a template pool. Templates in the pool can be tested when they are matched to testing images that may or may not show at least portions of the target objects. The image processing service can select templates for target object detection based on the testing and provide image assessment services using various template matching techniques incorporating the selected templates. In some embodiments, the employed template matching technique can be configured according to the identified areas of interest.

The template pool can be updated during the test application of templates or assessment of images. For example, images showing target objects discovered during the testing or assessment processes can be obtained as new training images for identifying regions of interest and generating new template candidates. Accordingly, the selection of templates and the image assessment services can be updated as well.

By way of an illustrative embodiment, the image processing service can be utilized to analyze images to determine whether images include depictions of artificial human models, figures or forms, such as mannequins. In this embodiment, the target object for detection in the images is one or more aspects of a mannequin, which may have a variety of appearances and depictions. For example, in digital images related to physical items for use by persons, a mannequin may be used to show how the item may look as worn by a human. However, in some images, a large portion of the mannequin may often be covered or blocked by different clothing items, jewelry, or accessories. Additionally, the portions of the mannequin that are depicted in images can be small and irregular and may often vary, for example, by color, shape, texture, and posing.

In accordance with this embodiment, certain portions of the mannequin, however, may have a high likelihood of appearing in relatively predictable regions in any image. They may also appear, in relation to one another, in relatively predicable locations. For example, the "head and neck" portion of a mannequin usually appears in the upper center region of training images, and a "hand or finger" portion usually appears to the lower left/right of the "head and neck" portion. Regions of interest corresponding to these mannequin portions can be identified, and templates for mannequin detection can be generated thereby. Regions of interest can also be mapped to images submitted for mannequin detection assessment so that, for example, the likely "head and neck" area of a submitted image is matched against "head and neck" templates. Accordingly, corresponding similarity measures can be calculated efficiently. Similarity measures calculated with respect to individual images submitted for assessment, may serve as inputs to one or more machine learning methods, such as Boolean classifiers, built or trained for mannequin detection. The method can output an assessment of the individual image indicating whether or how likely a mannequin is detected therein.

For purposes of illustration, the systems and processes disclosed herein are described primarily in the context of an image processing system that generates and selects templates, and matches templates against images that may depict mannequin(s). As will be apparent, however, the disclosed systems and processes may also be used in other types of systems, and can be used in the context of other target object(s), such as but not limited to humans, animals, signs, words, labels, automobiles, motorcycles, landscapes, etc. In addition, the disclosed systems and processes need not be implemented as part of, or in conjunction with, a web site or other network resource.

Overview of an Example Embodiment

FIG. 1 illustrates an embodiment of an image processing environment 100 that can implement the features described herein in the context of an example image processing service 102. In one aspect, the image processing service 102 can correspond to one or more network applications that perform, individually or in combination, the image processing functions described herein, including obtaining images, identifying regions of interest, generating templates, selecting templates, matching templates against images, assessing images for target object detection, etc. In another aspect, the image processing service 102 may be configured to update a template pool, template selection, or image assessment processes. In some embodiments, the image processing service 102 is associated with a network or network-based merchandise provider or vendor.

The image processing service 102 can correspond to any system capable of performing the processes described herein. In the depicted embodiment, the image processing service 102 includes several components that can be implemented in hardware or as software implemented by hardware. For example, in the illustrated embodiment of FIG. 1, the image processing service 102 includes an interface module 104 and a data processing module 106 that, when implemented by a hardware processor, execute the various methods contributing to target object detection described herein. The interface module 104 can facilitate generation of user interfaces (such as by providing instructions therefor) for display on a computing device associated with image source providers 130 or third party consumers 140. The data processing module 106 can be configured to process image, template, and auxiliary data (e.g., data indicating the presence, absence, or locations of target object, regions of interest, semantics of template, etc.). Although the interface module 104 and the data processing module 106 are identified in FIG. 1 as single modules, one skilled in the relevant art will appreciate that the modules may be implemented by two or more modules and in a distributed manner. Accordingly, the depictions of the modules are illustrative in nature.

The interface module 104 can be configured to facilitate generating one or more user interfaces through which an image source provider 130 or a third party consumer 140, utilizing a compatible computing device, may send to, or receive from, the image processing service 102 image, template, or auxiliary data, or otherwise communicate with the image processing service 102. Specifically, the interface module 104 can be configured to facilitate image processing functions described herein, including obtaining images, labeling areas within images as containing part(s) of target object, selecting templates and corresponding updates, assessing images for target object detection and corresponding updates, template pool updating, etc.

For example, an image source provider 130 may label or otherwise indicate areas in an image as depicting at least portions of a target object via one or more generated user interfaces. The user interface can be implemented as a graphical user interface (GUI), web-based user interface, computer program, smartphone or tablet program or application, touchscreen, command line interface, gesture, voice, or text interface, etc., or any combination thereof. Furthermore, the user interfaces can include indicators when an image has been processed or assessed, when a template has been tested or selected, or when a pool of templates, selection of templates, or an image assessment process has been updated.

The data processing module 106 can be configured to process image, template, and auxiliary data (e.g., data indicating the presence, absence, or locations of target objects, regions of interest, semantics of templates, etc.). Specifically, the data processing module 106 can be configured to perform image processing functions described herein, including obtaining images, identifying regions of interest, generating templates and corresponding updates to a template pool, selecting templates and corresponding updates to the selection, matching templates against images, assessing images for target object detection and corresponding updates to assessment processes, etc.

The image or template data processed by data processing module 106 can be of various formats. For example, the image or template data can correspond to an equation or table mapping illumination to x-y coordinates, a pixelized image, or other formats. Illustratively, in one embodiment, an image or template is represented by a number of pixels organized in a two-dimensional array. In this embodiment, pixels can be associated with a value, which can be a scalar value (as in a grayscale image) or a vector (as in a color image).

The image processing service 102 is communicatively connected to a template data store 110. The template data store 110 can generally include any repository, database, or information storage system that can store template data and associated auxiliary data. As described above, the template data stored in the template data store 110 can be of various formats. Auxiliary data can be associated with individual templates, for purposes of indicating the format, semantics, target object feature association, and the like. For example, auxiliary data may indicate the shape, size, and corresponding target object of an associated template. Auxiliary data may also indicate a relative location within an image where the template is derived.

The modules described above may also include additional modules or be implemented by computing devices that may not be depicted in FIG. 1. For example, the image processing service 102 and the interface module 104 can also be implemented by web servers, application servers, database servers, combinations of the same, or the like, configured to facilitate data transmission to and from image source providers 130 or third party consumers 140, via network 120.

The image source providers 130 can be associated with any computing device(s) that can facilitate communication with the image processing service 102 via network 120. Such computing devices can generally include wireless mobile devices (e.g., smart phones, PDAs, tablets, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

Similarly, the third party consumers 140 can be associated with any computing device(s) that can facilitate communication with the image processing service 102 via network 120. Such computing devices can generally include wireless mobile devices (e.g., smart phones, PDAs, tablets, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The network 120 may include any system for allowing multiple computing devices to communicate with each other. For example, the network 106 can be a Local Area Network (LAN), a Wide Area Network (WAN), a wireless network, a satellite network, a cable network, a cellular network, the Internet, combinations of the same, or the like.

Figure 2A:
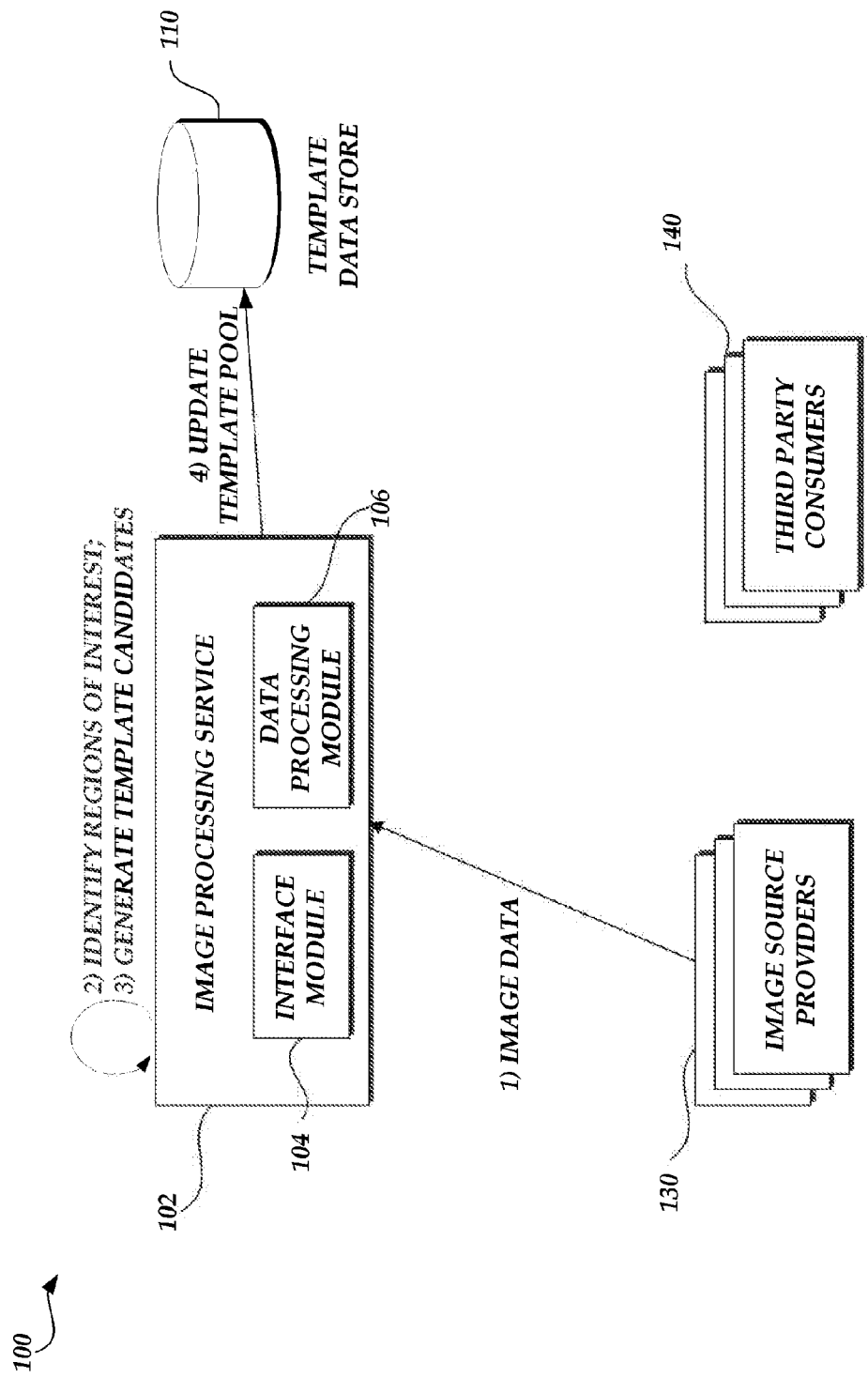
FIG. 2A is a simplified block diagram of the operating environment of FIG. 1 depicting an image processing service receiving image data from image source providers and generating template candidates.

FIG. 2A is a simplified block diagram of the image processing environment 100 of FIG. 1 depicting an image processing service 102 receiving image data from image source providers 130 and generating template candidates, in one embodiment. As depicted in FIG. 2A, at (1), an image source provider 130 can transmit image data to the image processing service 102. The image data transmission can be accomplished by the image source provider 130 accessing a user interface, such as a web page, whose generation is facilitated by an interface module 104. Image data that is transmitted can be formatted in various ways, for example, as an equation or table mapping illumination to x-y coordinates, a pixelized image, or other formats. As described earlier, auxiliary data can also be provided to the image processing service 102 to facilitate relevant processes and functions.

Illustratively, image data is transmitted at (1) for the purpose of providing training images for template generation. It should be noted that image data can be provided to the image processing service 102 for a number of other purposes including, but not limited to, providing testing images for template selection and providing images for target object detection assessment.

Upon receiving image data, at (2), the image processing service 102 can identify regions of interest within the training images that have been transmitted from the image source provider 130. The identification of regions of interest can be implemented or facilitated by an interface module 104, a data processing module 106, or their combination. For example, the interface module 104 may facilitate labeling or marking of areas with training images that depict at least a portion of the target object(s). The data processing module 106 may process the training images so that noise is removed and/or so that the image is rotated, resized, normalized, or otherwise manipulated to facilitate the identification of regions of interest or to facilitate a template generation process.

At (3), the image processing service 102 can perform the template generation process on the image data, and template candidates are generated thereby. This can be achieved or facilitated by the data processing module 106. For example, the data processing module 106 may sample the areas that are labeled or marked as containing portion(s) of the target object(s) and generate template candidates based on the sampling.

At (4), a template pool stored in a template data store 110 can be updated by the newly generated template candidates. There can be more than one template pool stored in the template data store 110, to suit the needs of different target object detection scenarios, to accommodate or be tailored for various computational methods, or to serve other purposes that can be envisioned. For example, template pools can be categorized based on mannequin type and sub-categorized based on the type of merchandise exhibited with the mannequin. With proper information included in the associated auxiliary data, template candidates can be added to a proper template pool. Template pool updating may also depend on other factors such as the image quality of the template candidates, the correlation between or among the template candidates and existing templates of different pools.

Figure 2B:
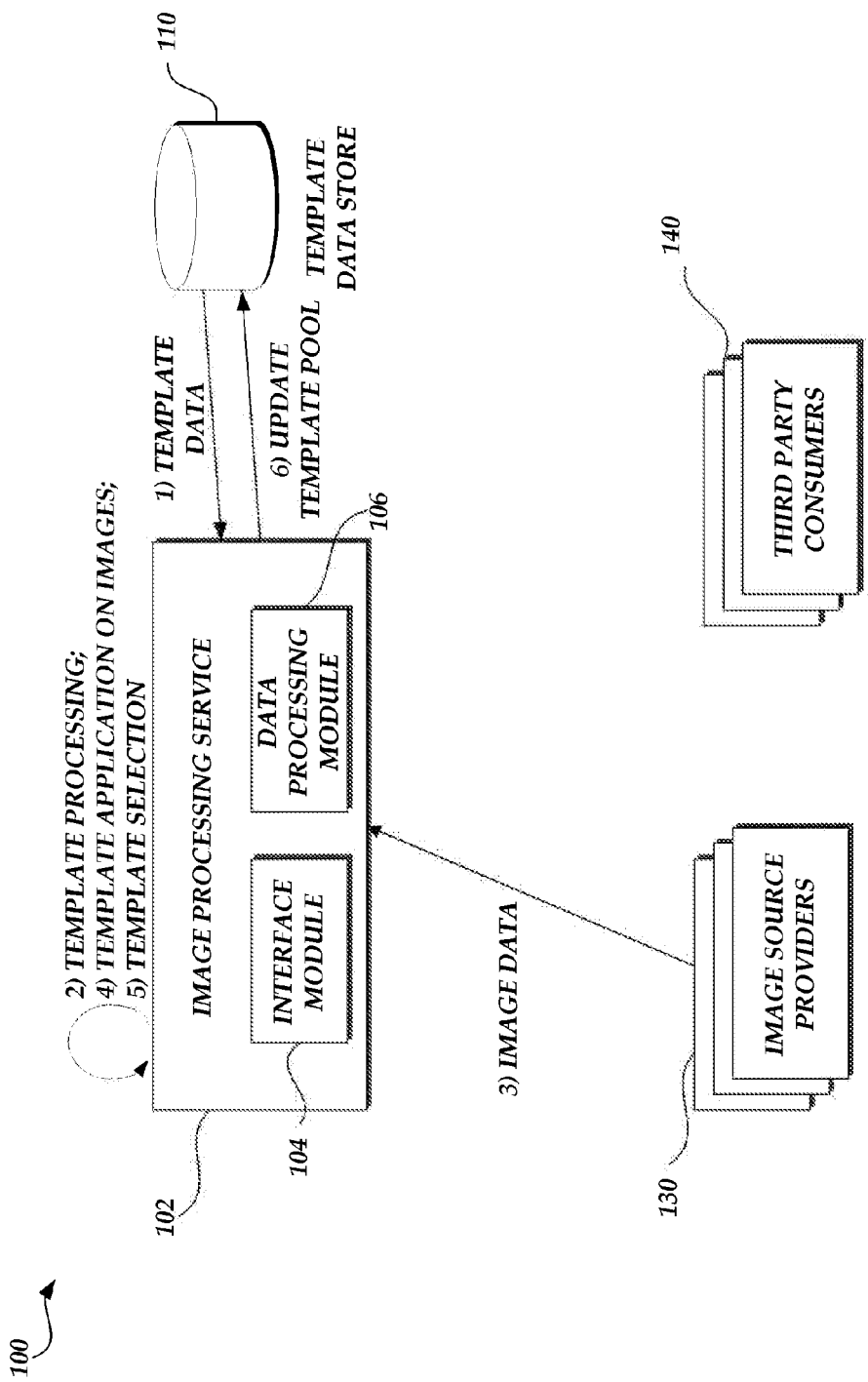
FIG. 2B is a simplified block diagram of the operating environment of FIG. 1 depicting an image processing service receiving template data from template data store, receiving image data from image providers, selecting templates and updating template pool.

FIG. 2B is a simplified block diagram of the image processing environment 100 of FIG. 1 depicting an image processing service 102 receiving template data from template data store 110, receiving image data from image providers 130, and selecting templates from and updating template pool. As depicted in FIG. 2B, at (1), template data can be retrieved from the template data store 110 to the image processing service 102. This can be accomplished by a data processing module 104 sending a request for a set of templates to the template data store 110, and in response to the request, the template data store 110 identifying and sending one or more template pools that satisfy the criteria indicated in the request. For example, the request may specify a particular type of target object, template format, template quantity, and the like. Template-associated auxiliary data can facilitate the identification of template pools, and can also be retrieved from the template data store 110 to the image processing service 102.

At (2), the retrieved templates can be processed by the image processing service 102. For example, templates can be converted to a format compatible with a template application or selection method. Templates can also be classified or prioritized based on applicable auxiliary data.

At (3), image data can be obtained from an image source provider 130 to the image processing service 102. The image data transmission can be accomplished by the image source provider 130 accessing a user interface, such as a network page, whose generation is facilitated by an interface module 104.

As described earlier, image data can be provided to the image processing service 102 for a number of purposes. Illustratively, image data is transmitted at (3) for the purpose of providing images for test application and selection of templates. Image data that is transmitted can be formatted in various ways, for example, as an equation or table mapping illumination to x-y coordinates, a pixelized image, or other formats. As described earlier, auxiliary data can also be provided to the image processing service 102 to facilitate relevant processes and functions.

Upon receiving image data, at (4), the image processing service 102 can pre-process the image data as necessary and apply retrieved templates on the obtained images. For example, individual template(s) are matched against the obtained image(s) based on a computational method, such as sum of squared differences (SSD) or sum of absolute differences (SAD) based convolution, and matching score(s) are generated for each template-image pair.

At (5), the image processing service 102 can select a subset of templates based on the test application of templates on the obtained images. One or more classifiers capable of receiving the matching score(s) as inputs can facilitate the selection. Alternatively, the selection can be based on information redundancy represented by the matching score(s) themselves. For example, Singular Value Decomposition (SVD) or other correlation-oriented computational methods can be applied on the generated matching score(s) to weed out informational redundancy, so that template(s) that form the basis for contributing distinct and/or significant information are selected.

At (6), the image processing service 102 can update affected template pool(s) stored in the template data store 110 based on selected templates. For example, templates that are not selected can be deleted from corresponding template pool(s), or, auxiliary data associated with templates can be updated to reflect the selection/non-selection.

Figure 2C:
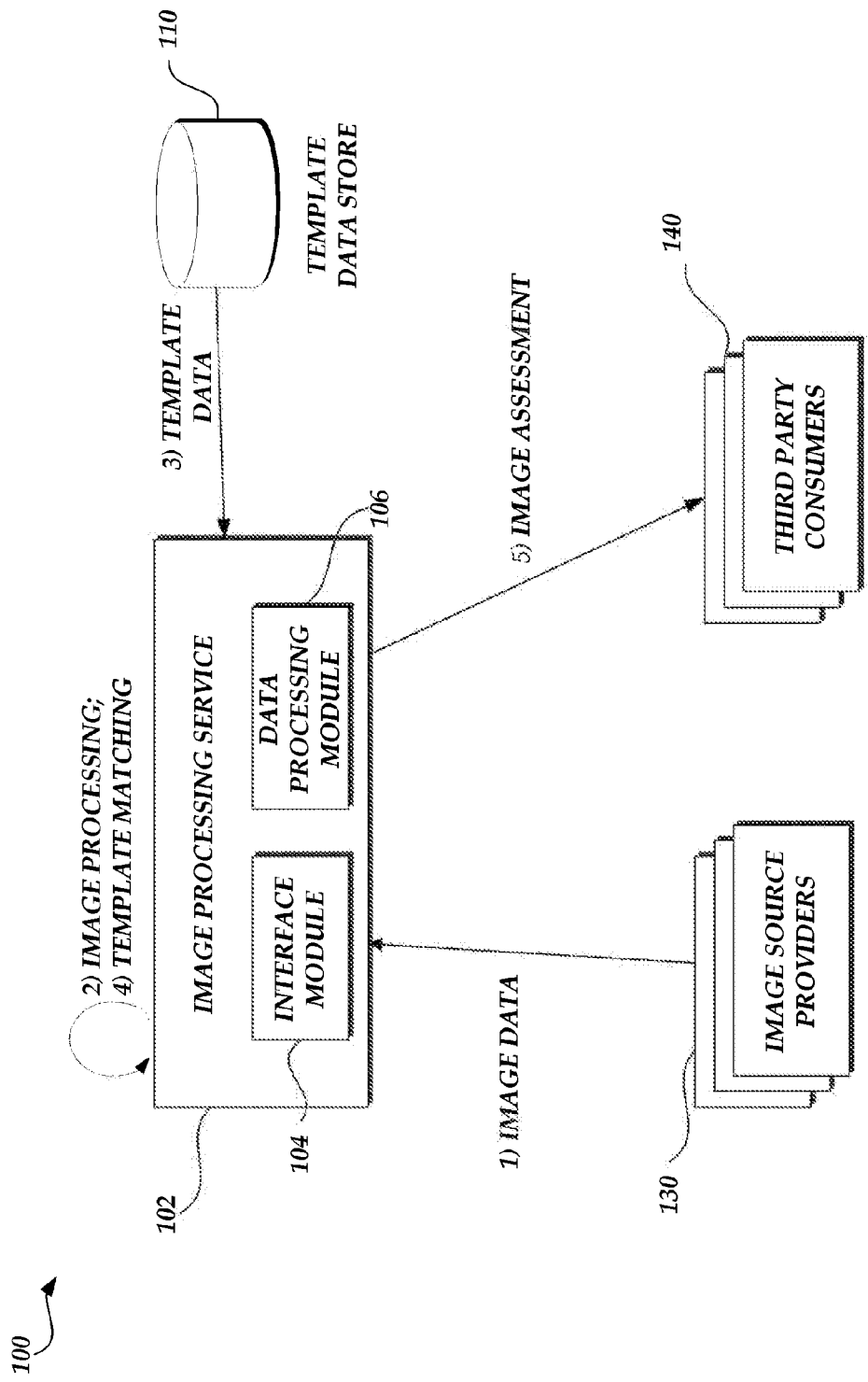
FIG. 2C is a simplified block diagram of the operating environment of FIG. 1 depicting an image processing service receiving image data from image source providers and providing image assessment to third party consumers.

FIG. 2C is a simplified block diagram of the image processing environment 100 of FIG. 1 depicting an image processing service 102 receiving image data from image source providers 130 and providing image assessment to third party consumers 140. As depicted in FIG. 2C, at (1), an image source provider 130 can transmit image data to the image processing service 102. The image data transmission can be accomplished by the image source provider 130 accessing a user interface, such as a network page, whose generation is facilitated by an interface module 104.

As described earlier, image data can be provided to the image processing service 102 for a number of purposes. Illustratively, image data is transmitted at (1) for the purpose of providing images for target object detection assessment. Image data that is transmitted can be formatted in various ways, for example, as an equation or table mapping illumination to x-y coordinates, a pixelized image, or other formats. As described earlier, auxiliary data can also be provided to the image processing service 102 to facilitate relevant processes and functions.

Upon receiving the image data, at (2), the image processing service 102 can process the image data. The image data processing can be implemented by a data processing module 106 included in the image processing service 102.

The image(s) represented by the image data may be processed to remove excessive noise, be rotated to a standardized orientation, or be manipulated otherwise to facilitate an image assessment process for target object detection. At (3), the image processing service 102 can retrieve applicable template data from one or more proper template pools stored in the template data store 110. Auxiliary data associated with the image data can facilitate the retrieval of the templates.

At (4), the template(s) retrieved can be matched against the image(s) based on a computational method, such as sum of squared differences (SSD) or sum of absolute differences (SAD) based convolution, and matching result(s) are generated for each image. At (5), the image processing service 102 can provide image assessment to the third party consumers 140, who may or may not be the same entities as the image source providers 130. The image assessment may be a Boolean or probabilistic determination of whether the target object is detected within an image, based on the matching result(s).

Example Template Generation Process

FIG. 3A is a flow diagram of an illustrative method 302 implemented by a data processing module 106, as depicted in FIG. 1, for generating templates for target object detection based on identified regions of interest within image.

At block 304, one or more images showing target object is obtained. For example, a set of training images can be obtained, where each image contains a mannequin (target object). This can be accomplished by obtaining image data from image source providers 130 via their image data transmission to an image processing service 102. In one embodiment, images transmitted may be images designated for training, e.g., with at least a portion of a mannequin depicted in each image. In another embodiment, images transmitted may need to be manually assessed and filtered so that only those depicting mannequin(s) are retained.

At block 306, regions of interest are identified within the images obtained. Illustratively, given a set of training images each containing a mannequin, regions of interest can be identified by determining a likelihood of individual pixels of an image constituting a mannequin pixel, for the set of training images. In one embodiment, the training images may include areas labeled as containing part(s) of a mannequin. Such labeled areas may come in different shapes or sizes, depending on area labeling mechanisms or limitations. Such areas can be manually or automatically labeled before the training images are transmitted to the image processing service 102, or, can be labeled as part of the template generation process. The training images may include auxiliary data associated with labeled areas. Such auxiliary data may indicate the exactitude of the labeling, the relative coverage of the labeled area by mannequin part(s), the mannequin part(s) or feature(s) represented by the labeled area (e.g., finger, wrist, neck or certain facial areas), and the like. Additionally, the regions of interest can be identified based on the labeled areas. The regions identified can be rectangular, triangular, or any other shape. In some cases, the shape is determined by the template matching technique employed; in other cases, the shape is determined for computational convenience; and in still other cases, the shape is determined by features of the target object.

Illustratively, each training image can be converted into a binary image, wherein the foreground represents the labeled areas and the background represents the remaining areas. In this case, each foreground pixel can be assigned a scalar value of 1, and each background pixel can be assigned a scalar value of 0. Because the size of individual training images can vary, each binary image may need to be rescaled to a reference size, for example, 250-by-250 pixels. Pixel values can then be summed up per pixel across all binary images of the training set, so that a 250-by-250 pixel frequency map can be produced, where the value of individual pixels represents the number of times individual pixels of an image constitute a mannequin pixel, within the training set.

The frequency map can be normalized to generate a probability map of the reference size, which indicates the likelihood of individual pixels constituting a mannequin pixel. The normalization can be achieved by dividing individual pixel values of the frequency map by the size of the training set.

Optionally, the frequency map and corresponding probability map may be generated in accordance with auxiliary data associated with labeled areas. For example, probability maps with respect to particular mannequin parts or features can be generated. As another example, individual training images can be converted into an intensity image instead of a binary image, where pixel values corresponding to a labeled area may be determined based on the relative coverage of the labeled area by mannequin part(s), or, based on the exactitude of the area labeling.

The regions of interest can then be identified based on the probability map. In one embodiment, local maxima of pixel values can be identified from the probability map and regions encompassing the local maxima can be determined based on the distribution of pixel values in the vicinity of individual local maxima pixels. For example, a region encompassing a local maximum pixel can be determined based on a gradient map of pixels values—similar to marking out the top of a hill based on the steepness of surrounding slopes. Regions of interest specific to an image can be identified by mapping the determined regions in the probability map to the image by, for example, re-centering and resizing the regions based on the relative sizes of the image and of the probability map.

In another embodiment, the regions of interest in the probability map can be identified using threshold values, for example, regions whose constituent pixels all having a value greater than a specified threshold value. Again, auxiliary data associated with labeled areas can be utilized to determine threshold values. For example, different threshold values may be determined for different mannequin parts or features. Similarly, regions of interest specific to an image can be identified by mapping the identified regions in the probability map to the image by re-centering and resizing.

In some embodiments, the probability map can be generated without areas labeling. For example, a pixel value in the probability map can be calculated based on pixel-centered template-matching scores. A pixel-centered template-matching score can be generated by matching existing template(s) against a specified area centered at individual pixels in a training image, using sum of squared differences (SSD) or sum of absolute differences (SAD) based convolution, or any other computational methods.

At block 308, template candidates are generated based on identified regions of interest. In one embodiment, for each training image, template candidates can be generated by random sampling a specified number of template candidates within the overlapping areas between regions of interest and areas labeled as containing mannequin part(s). The size and shape of the template candidate images can be determined by the size and shape of corresponding regions of interest and labeled areas. For example, the template candidate size should be sufficiently smaller than that of the regions of interest and labeled areas, to allow for a meaningful random sampling.

The size and shape of the template candidate images may also be determined by the auxiliary information associated with the labeled areas. For example, relatively small and elongate template candidates may be desired with respect to mannequin fingers, whereas relatively large and square-like template candidates may fit for mannequin necks.

In one embodiment, a single template candidate can include multiple disconnected areas within a training image. For example, a template candidate can include a 50-by-50 pixel area located in the upper-center (possibly corresponding to a "head & neck" part of a mannequin) of a training image and also a 20-by-40 pixel area located in the lower-left (possibly corresponding to a "hand" part of a mannequin) of the training image.

At block 310, a pool of templates is updated with newly generated template candidates. The newly generated template candidates may be pre-screened based on quality of image or other criteria before they are added to the template pool. Template candidates may also need to be pre-processed or converted to a format compatible with existing templates. Auxiliary data may also be generated and associated with each template candidate as they are added to the pool of templates. For example, as previously described, the auxiliary data may indicate the format, semantics, target object feature association, relation to other template(s), compatible computational method(s) and the like. For template candidates including multiple disconnected areas, the auxiliary data may also indicate the relative location between or among the disconnected areas. The template generation routine 302 ends at block 312.

Figure 3B:
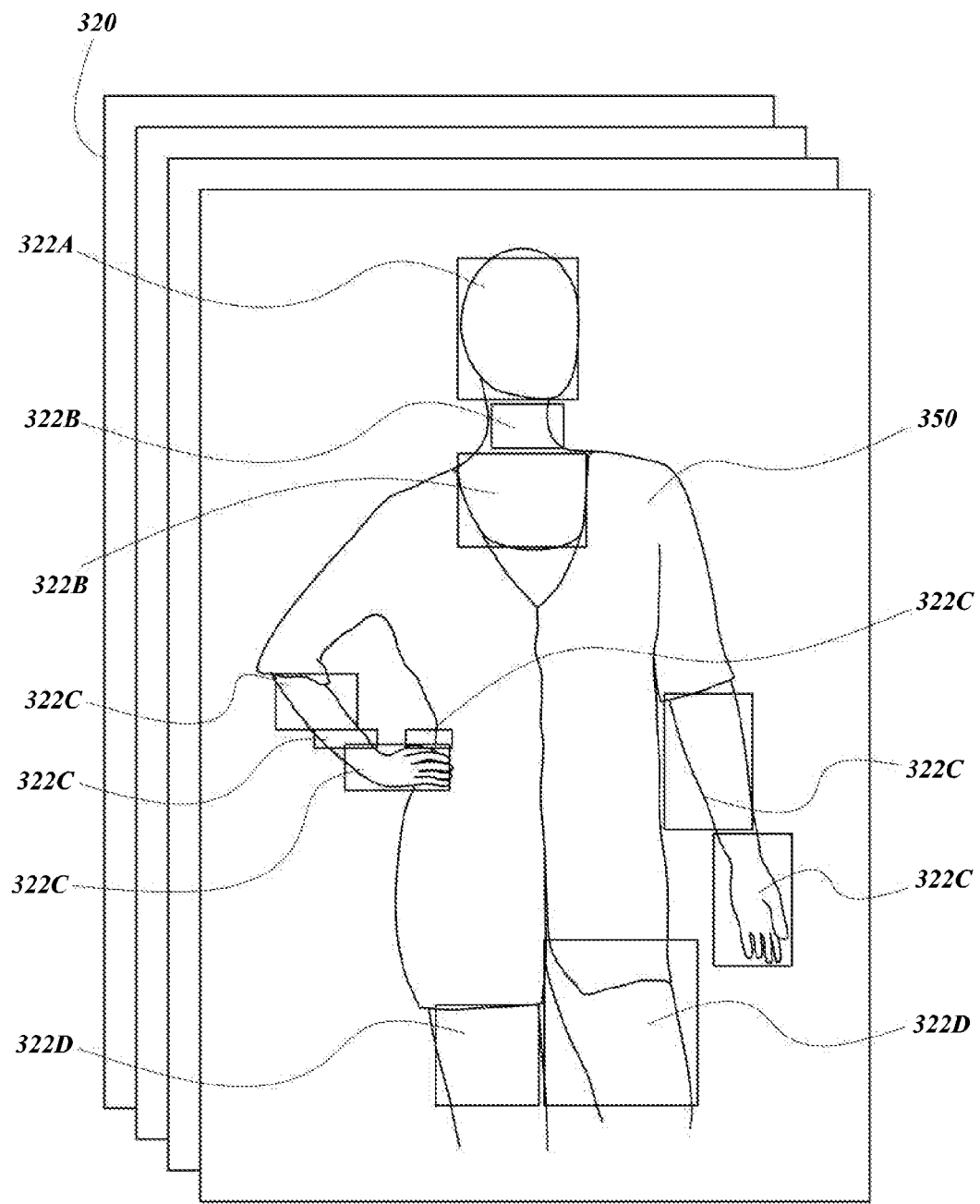
FIGS. 3B-3D are pictorial diagrams of one or more sample images to which the illustrative method of FIG. 3A may be applied.
Figure 3C:
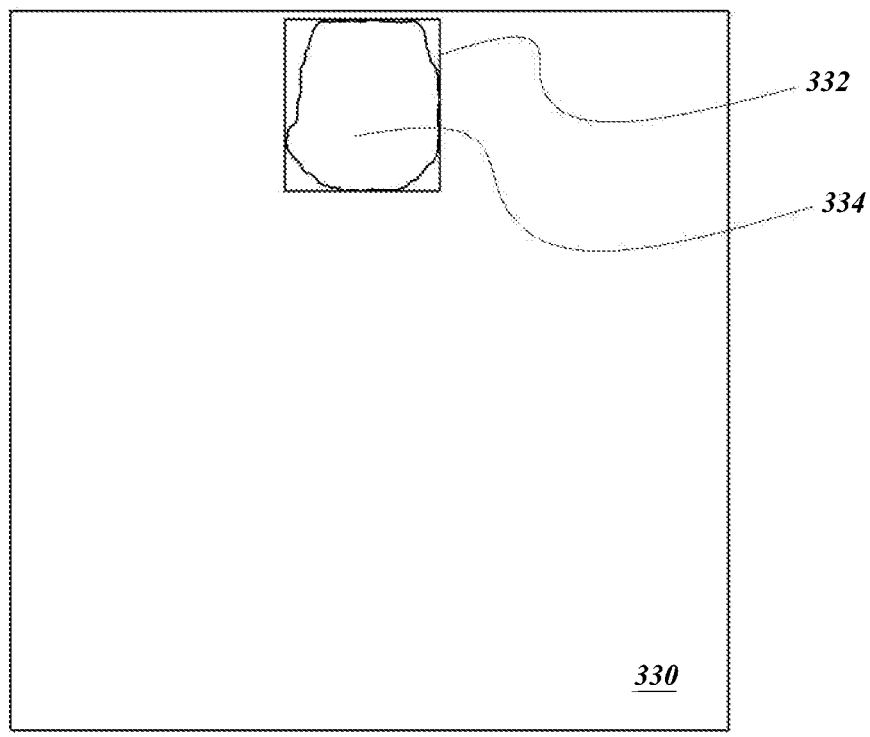
Figure 3D:
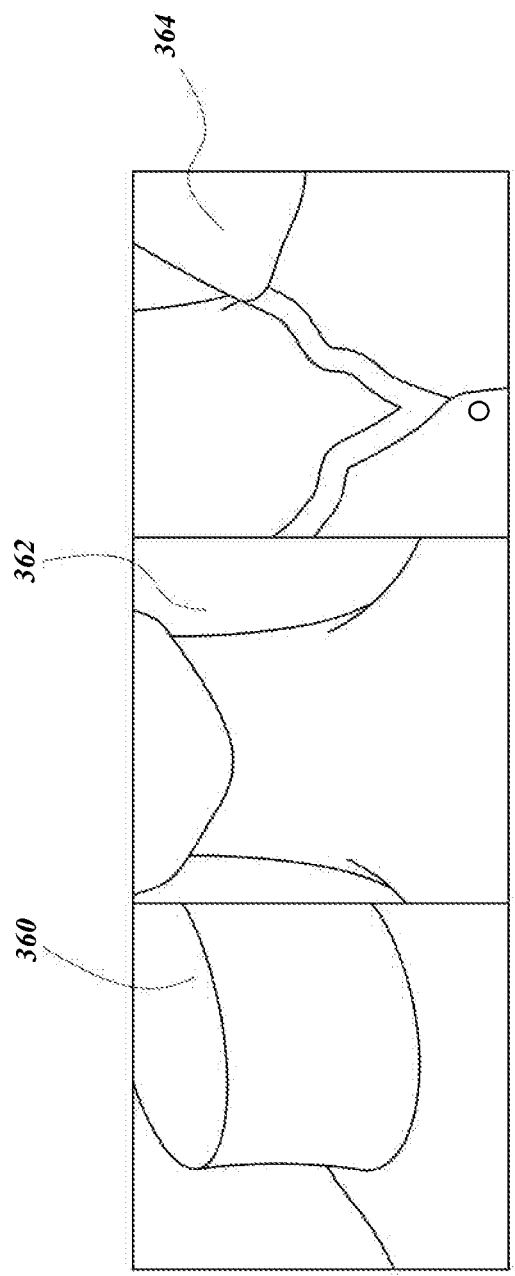

FIGS. 3B-3D are pictorial diagrams of one or more sample images to which the illustrative method of FIG. 3A may be applied. With reference to FIG. 3B, illustratively, labeled areas 322 on a training image 320 are rectangular in shape and contain exposed part(s) of a mannequin 350. For example, labeled area 332A contains the "head" part of the mannequin 350, labeled areas 332B contain the "neck" part of the mannequin 350, labeled areas 332C contain the "forearms and hands" part of the mannequin 350, and labeled areas 332D contain the "thighs" part of the mannequin 350. The labeled areas 332 can be manually or automatically marked and labeled by an image source content provider 130.

A probability map 330 can be generated based on labeled areas 322 across all training images 320 as depicted in FIG. 3B. In this example, assume most labeled areas 322 across all training images 320 contain the "head" and "neck" parts of a mannequin 350. A region of interest 332 corresponding to the "head and neck" portion of mannequins can be identified on the probability map 330, using a rectangular bounding box covering pixels 334 whose values exceed a certain threshold. With reference to FIG. 3D, template candidates 360, 362 and 364 can be generated by mapping the identified region of interest 332 as depicted in FIG. 3C back to the training images 320 as depicted in FIG. 3B, and sampling within the corresponding mapped regions of the training images 320. Illustratively, template candidates 360, 362 and 364 represent sampled portions of correspondingly mapped "head and neck" regions of mannequins as depicted by training images 320.

Example Template Selection Process

Figure 4:
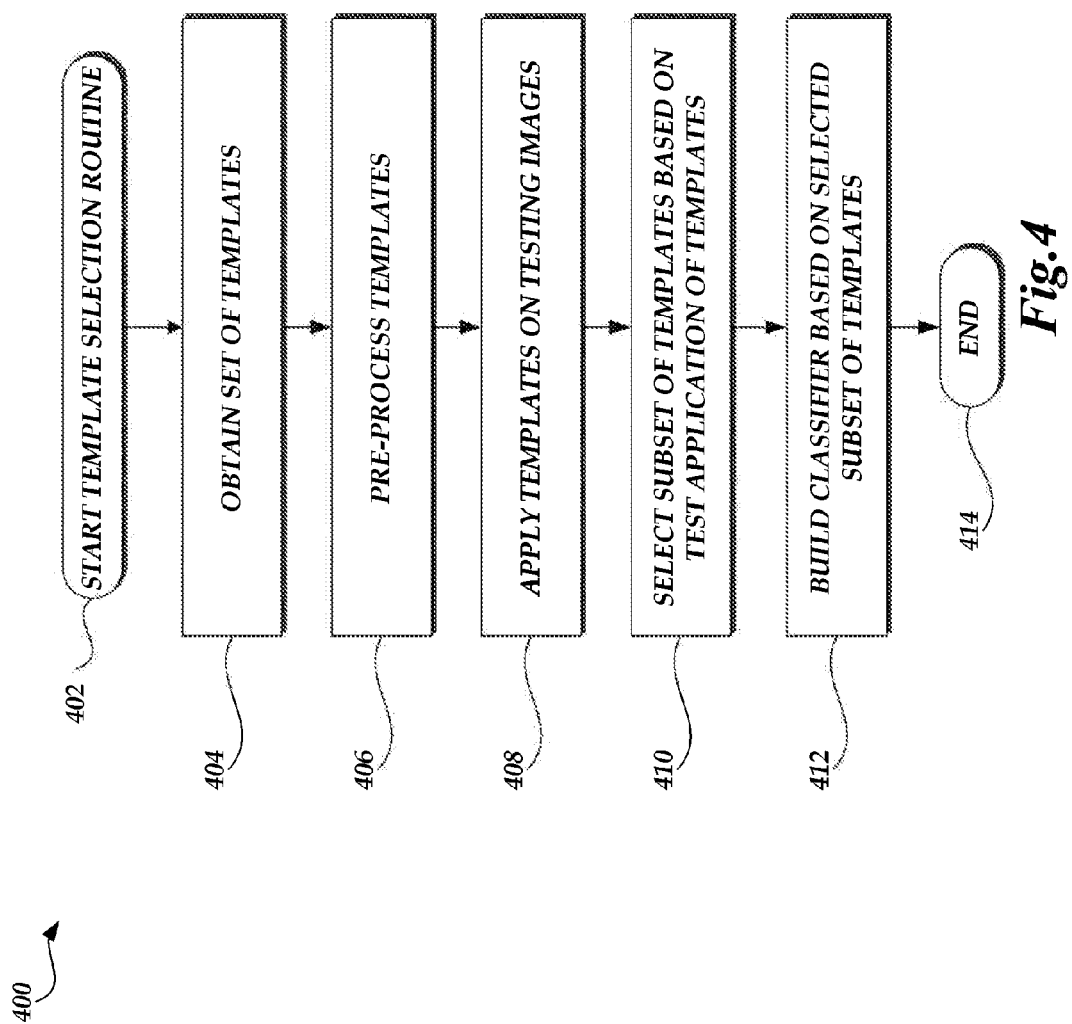
FIG. 4 is a flow diagram of an illustrative method implemented by a data processing module for applying templates on testing images and selecting templates based on the test application of templates.

FIG. 4 is a flow diagram of an illustrative method 402 implemented by a data processing module 106, as depicted in FIG. 1, for applying templates on testing images and selecting templates based on the test application of templates.

At block 404, a set of templates are obtained for selection of a subset therefrom. Templates may be obtained from one or more template pools stored in a template data store 110. Auxiliary data associated with templates can also be obtained to facilitate template application and selection. Templates can be obtained based on the type of target object to be detected, the application or selection method to be employed, or the capacity of the computing environment hosting the data processing module 106. The data processing module 106 may send a request for templates, specifying template obtaining criteria, to the template data store 110. For example, the request may specify that templates be rectangular in shape, correspond to mannequins exhibiting clothing items, and/or specify the minimum or maximum size of the templates. In response to the request, the template data store 110 can identify one or more proper template pools, retrieve templates based on the request, and transmit the template data and associated auxiliary data to the data processing module 106.

At block 406, the obtained templates are pre-processed. Illustratively, templates may need to be converted to a format compatible with the template application or selection method. Templates may also need to be classified or prioritized based on applicable auxiliary data. Accordingly, pre-processing can include format conversion and noise removal. It can also include rotation to a standardized orientation, normalization in shape, size, resolution, or color-distribution, or other manipulations to facilitate relevant processes and methods. Further, it can include grouping or weighting the templates.

At block 408, templates are applied on a set of testing images. The set of testing images can be provided to the data processing module 106 by image source provider(s) 130 via an interface module 104. Auxiliary data associated with individual testing images can be provided as well, which may indicate the presence, absence, or location of a target object.

Individual templates can be applied to the testing images based on a computational method configured with the template. Depending on the computational method employed, scalar or vector matching score(s) can also be generated when templates are applied to the testing images, whether individually or in groups. For example, individual templates can be matched against corresponding regions of interest of each testing image via sum of squared differences (SSD) or sum of absolute differences (SAD) based convolution, or any other computational methods, through which a scalar matching score can be calculated for individual template-testing image pairs.

Templates can also be applied in groups. For example, a group of multiple templates can be matched against individual testing images, and a vector matching score or a weighted average of scalar matching scores corresponding to individual templates within the group can be generated. Group-based template application may also utilize correlations between or among templates for calculating a group-based matching score. For example, if two templates within a group are highly correlated, a group matching score can be calculated in a way that limits the contribution originated from at least one of the two templates.

At block 410, a subset of templates is selected based on the test application of templates. The selection process may utilize one or more binary classifiers, which can be defined using one or more specified threshold values such that a testing image is classified as showing a target object if a corresponding matching score exceeds the threshold value. Based on this set up, Adaboost or other classifier-based feature selection algorithms or methods can be applied to reduce the redundancy of obtained templates.

It should be noted that the template selection does not require the use of classifiers. For example, Singular Value Decomposition (SVD) or other correlation-oriented computational methods can be applied on the generated matching score(s) to weed out informational redundancy, so that template(s) that form the basis for contributing more distinct and/or significant information are selected.

At block 412, a classifier for target object detection is built based on selected subset of templates. A classifier employed by the image processing service 102 can be configured based on the selected subset of templates for target object detection in subsequent images transmitted by the image source providers 130. Alternatively or additionally, the selected subset of templates can be provided by the image processing service 102 to the image source providers 130 so that they can configure their own classifiers for target object detection. The template selection routine 402 ends at block 414.

Example Image Scoring and Assessment Process

Figure 5:
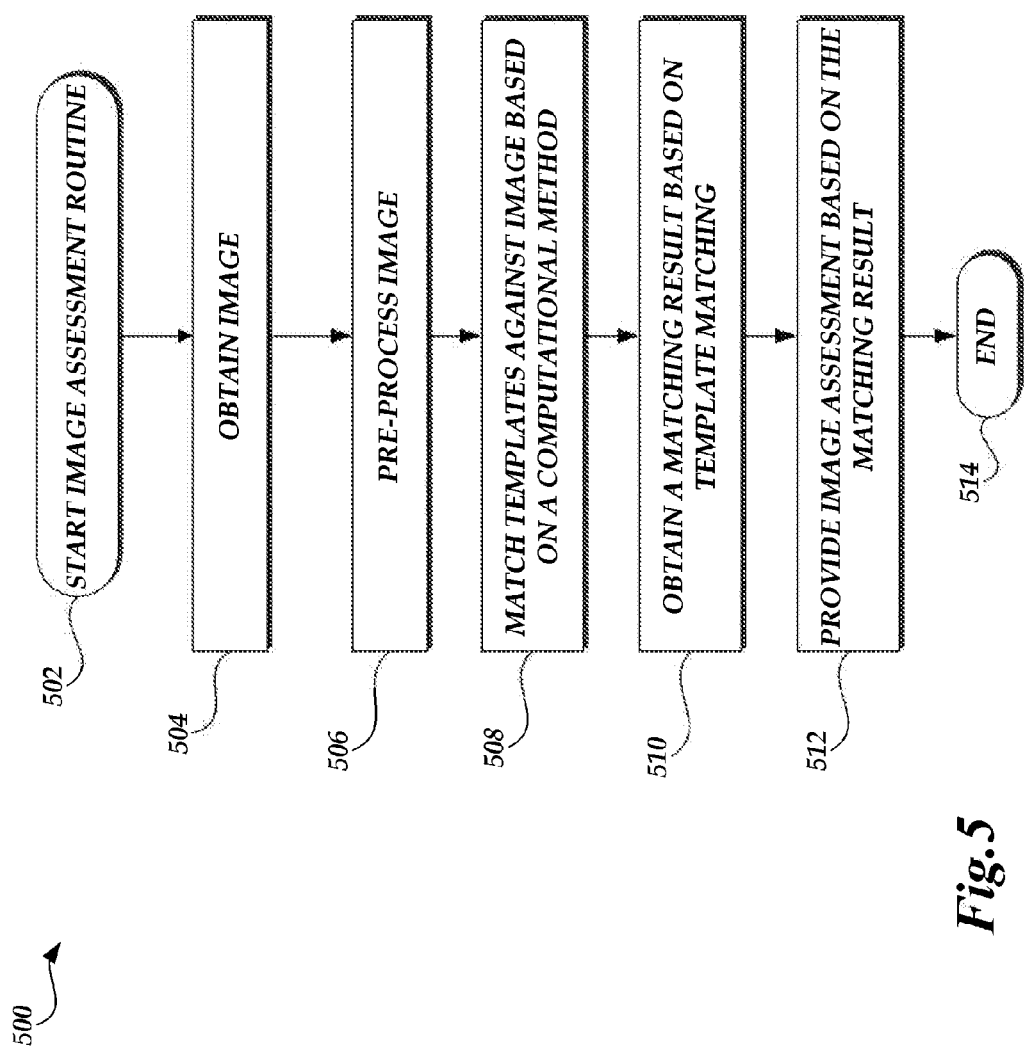
FIG. 5 is a flow diagram of an illustrative method implemented by a data processing module for assessing an image for target object detection.

FIG. 5 is a flow diagram of an illustrative method 502 implemented by a data processing module 106, as depicted in FIG. 1, for assessing an image for target object detection. The flow diagram begins at block 504, where an image is obtained for assessment for target object detection based on applicable templates. This can be accomplished by obtaining image data from image source providers 130 via image data transmissions to an image processing service 102. As described earlier, image-associated auxiliary data can also be obtained, which may indicate the type of target object(s) for which the image should be assessed.

At block 506, the image is pre-processed. The image may be pre-processed to remove excessive noise, be converted to a compatible format, be segmented for computational convenience, be rotated to a standardized orientation, be normalized in shape, size, resolution, or color-distribution, or be otherwise manipulated to facilitate a scoring or assessment technique. Next, at block 508, a set of templates are matched against the image. The set of templates may have been obtained to meet the requirements or information included in the image-associated auxiliary data. The set of templates may have been selected from one or more template pools based on the template selection process as depicted in FIG. 4. In one embodiment, individual templates are matched against the image separately, and a template-specific measure can be generated with respect to the matching of individual templates and the image. In another embodiment, the set of templates, as a whole, can be matched against the image, and an overall measure can be generated with respect to the matching of the whole set and the image. In still another embodiment, the set of templates can be matched against the image in groups. Template matching can utilize any computational method such as sum of squared differences (SSD) or sum of absolute differences (SAD) based convolution.

The set of templates may be associated with auxiliary information which can be used to configure or modify the template-matching. For example, some templates may comprise disconnected areas, such as the left-hand and right-hand areas of a mannequin, whose relative locations are indicated in associated auxiliary data. The relative locations or their variations may be incorporated into the template-matching. In some embodiments, the template matching can be performed on the entire image for thoroughness. In other embodiments, the template-matching may be based on areas of interest indicated by the auxiliary data associated with the templates or the image. If such information is indicated by the auxiliary data of the templates, the areas of interest can be mapped to the image so that only portions of the image corresponding to the areas of interest are matched by templates.

At block 510, a matching result is obtained based on the template matching. Depending on the computational method employed for template matching, the matching result can include one or more measures, in scalar or vector form. The matching result can serve as input feature(s) to classifier(s), clustering algorithm(s), neural network system(s) or other machine learning or computational learning methods for purposes of target object(s) detection. In some embodiments, the matching result is a vector comprising all individual template-specific measures generated during the template-matching. The matching result can also be calculated based on multiple template-specific measures or the single overall measure. For example, the matching result can be a weighted average of multiple template-specific measures, or, a normalized version of the overall measure. In some embodiments, correlations among templates can affect the matching result determination. Such information can be provided by the auxiliary data associated with templates, or can be calculated based on the set of templates.

At block 512, image assessment is provided based on the matching result. As described earlier, various classification, clustering, neural networking, or other machine learning or computational learning methods can be employed to provide image assessment for target object detection, based on the matching result. In one embodiment, a classifier built and trained to detect target object(s) as indicated by the auxiliary data associated with the templates or the image, can be employed to provide the assessment. The classifier takes in the matching result as input feature(s) and outputs a Boolean classification result, e.g., whether the image depicts a mannequin, or a probabilistic classification result, e.g., the likelihood that the image depicts a mannequin. This Boolean or probability value can be provided to third party consumers 140 as the result of the image assessment.

In another embodiment, multiple classifiers can be employed by the assessment process. For example, the classifiers can be organized sequentially so that a subsequent classifier may refine the result provided by a preceding classifier. As another example, the classifiers can be organized in parallel and a voting mechanism can be implemented to synthesize or consolidate the results generated by individual classifiers. As still another example, the organization of classifiers can be a tree or a lattice, or otherwise optimized for the detection of the target object(s). The image assessment routine 502 ends at block 514.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for mannequin detection within an image, the computer-implemented method comprising:

under control of a hardware computing device configured with specific computer-executable instructions, obtaining a first set of electronic training images depicting mannequins, wherein each electronic training image of the first set includes a first target object for detection, wherein the first target object corresponds to a detectable portion of a mannequin;

identifying a plurality of regions within each electronic training image of the first set, wherein a region of the plurality of regions includes at least a portion of the first target object for detection;

for each region of the plurality of regions, determining an associated likelihood of the region showing at least part of the first target object based, at least in part, on a location of the region relative to a corresponding electronic training image in accordance with a location distribution of the first target object over the first set of electronic training images and on a measure of coverage by an unobstructed portion of the first target object relative to the area of the region;

generating a set of templates based at least in part on a subset of the plurality of regions, wherein the previously determined associated likelihood of each region of the subset exceeds a threshold value defining a high likelihood;

causing configuration of a first classifier for detecting a second target object, wherein the second target object corresponds to a detectable portion of a mannequin, and wherein the configuration of the first classifier is based at least in part on a subset of the set of templates;

causing application of the subset of templates on a second set of electronic training images depicting mannequins to detect the second target object from the second set of electronic training images using the first classifier; and causing configuration of a second classifier for detecting a third target object from a target set of electronic images, wherein the configuration of the second classifier is based at least in part on a template of the applied subset of templates and wherein a depiction of mannequins in the target set of electronic images is unknown.

2. The computer-implemented method of claim 1, wherein the first, second, and third target objects are a same target object.

3. The computer-implemented method of claim 1, wherein the region of the plurality of regions depicts at least an obstructed portion of the first target object.

4. The computer-implemented method of claim 1, wherein identifying the plurality of regions comprises labeling a plurality of areas within each electronic image of the first set as containing at least part of the first target object.

5. The computer-implemented method of claim 1, wherein the threshold value is predetermined.

6. A computer-implemented method comprising:
under control of a hardware computing device configured with specific computer-executable instructions,
for each region of a plurality of regions within an electronic image, determining an associated likelihood of the region showing at least part of a first target object based, at least in part, on a location of the region relative to the electronic image in accordance with a location distribution of the first target object over a first plurality of electronic images and on a measure of coverage by an unobstructed portion of the first target object relative to the area of the region, wherein the electronic image belongs to first plurality of electronic images;

selecting a region of interest from the plurality of regions, wherein the associated likelihood of the region of interest exceeds a threshold value defining a high likelihood;

generating a plurality of templates based at least in part on the region of interest; and causing testing of a subset of the plurality of templates for detecting a second target object, the testing comprising:
obtaining a second plurality of electronic images;
determining a region within each of the second plurality of electronic images, wherein the determined region corresponds to the region of interest of the first plurality of electronic images;
configuring a classifier for detecting the second target object based at least in part on the determined region; and
obtaining performance information related to the classifier in detecting the second target object from the second plurality of electronic images.

7. The computer-implemented method of claim 6, further comprising causing configuration of an other classifier for detecting a third target object, wherein the configuration of the other classifier is based at least in part on a template of the plurality of templates.

8. The computer-implemented method of claim 6, further comprising causing configuration of an other classifier for detecting a third target object, wherein the configuration of the classifier is based at least in part on the region of interest.

9. The computer-implemented method of claim 6, further comprising updating the plurality of templates based at least in part on the second plurality of electronic images.

10. The computer-implemented method of claim 6, wherein the generating of the plurality of templates comprises generating a sample from the region of interest and generating a template based on the sample.

11. A system comprising:
a data store configured to store computer-executable instructions; and
a hardware processor in communication with the data store, the hardware processor, configured to execute the computer-executable instructions to at least:
obtain a first set of images, wherein each image of the first set includes a first target object for detection;
identify a plurality of regions within each image of the first set, wherein a region of the plurality of regions includes at least a portion of the first target object;
for each region of the plurality of regions, determine an associated likelihood of the region showing at least part of the first target object based, at least in part, on a location of the region relative to a corresponding image in accordance with a location distribution of the first target object over the first set of images and on a measure of coverage by an unobstructed portion of the first target object relative to the area of the region;
generate a set of templates based at least in part on a subset of the plurality of regions, wherein the previously determined associated likelihood of each region of the subset exceeds a threshold value defining a high likelihood;
cause selection of a subset of the set of templates based at least on performance information related to detecting a second target object, wherein the second target object is detected from a second set of images using a first classifier, and wherein the first classifier is configured based at least in part on the selected subset of templates; and
cause a second classifier to be configured for detecting a third target object from a third set of images, wherein the second classifier is configured based at least in part on a template of the selected subset of templates.

12. The system of claim 11, wherein the first, second, and third target objects are a same target object.

13. The system of claim 11, wherein the region of the plurality of regions includes at least an obstructed portion of the first target object.

14. The system of claim 11, wherein identifying the plurality of regions comprises labeling an area within each image of the first set as containing at least part of the first target object.

15. The system of claim 14, wherein labeling the area comprises associating the area with a feature of the first target object.

16. The system of claim 11, wherein the threshold value is predetermined.

17. The system of claim 11, wherein the hardware processor is further configured to determine the associated likelihood of the region based on individual pixels of each image of the first set of images constituting a pixel of the first target object.

18. The system of claim 11, wherein generating the set of templates comprises generating a sample within a region of the identified plurality of regions and generating templates based on the sample.

19. The system of claim 11, wherein causing selection of the subset of the set of templates includes causing selection of the subset from all templates in the set of templates.

20. A non-transitory computer-readable storage medium storing computer-executable instructions that when executed by a processor perform operations comprising:

for each region of a plurality of regions within an image, determining an associated likelihood of the region showing at least part of a first target object based, at least in part, on a location of the region relative to the image in accordance with a location distribution of the first target object over a first plurality of images and on a measure of coverage by an identified unobstructed portion of the first target object relative to the area of the region, wherein the image belongs to the first plurality of images;

selecting a region of interest from the plurality of regions, wherein the associated likelihood of the region of interest exceeds a threshold value defining a high likelihood;

generating a plurality of templates based at least in part on the selected region of interest; and causing testing of a subset of the plurality of templates for detecting a second target object, the testing comprising:
obtaining a second plurality of images;
determining a region within each of the second plurality of images, wherein the determined region corresponds to the region of interest of the first plurality of images;
configuring a classifier for detecting the second target object based at least in part on the determined region; and
obtaining performance information related to the classifier in detecting the second target object from the second plurality of images.

21. The non-transitory computer-readable storage medium of claim 20, wherein the operations further comprise updating the plurality of templates based at least in part on the second plurality of images.

22. The non-transitory computer-readable storage medium of claim 20, wherein the operations further comprise selecting the subset of templates from the plurality of templates based at least in part on the second plurality of images.

23. The non-transitory computer-readable storage medium of claim 20, wherein generating the plurality of templates comprises generating a sample from the region of interest and generating a template based on the sample.

* * * * *